United States Patent [19]
Yatim et al.

[11] Patent Number: 5,963,588
[45] Date of Patent: Oct. 5, 1999

[54] APPARATUS FOR MODULATING/ DEMODULATING SIGNALS

[75] Inventors: David Yatim; Jim Girardeau, both of Austin, Tex.

[73] Assignee: Motorola, Inc., Schaumburg, Ill.

[21] Appl. No.: 08/822,966

[22] Filed: Mar. 21, 1997

[51] Int. Cl.$^6$ .............................. H04B 1/38; H04J 3/00; H04M 1/00; H03K 3/00

[52] U.S. Cl. ........................ 375/222; 375/219; 370/420; 370/476; 379/402; 379/93.6; 332/108

[58] Field of Search ...................... 375/222, 219; 370/420, 476, 506, 465, 522, 524; 379/93.28, 93.29, 402, 93.01, 93.05, 93.06, 93.07, 93.09, 93.11, 93.14, 93.34; 332/108; 329/348, 349, 353

[56] References Cited

U.S. PATENT DOCUMENTS

| | | | |
|---|---|---|---|
| 4,884,269 | 11/1989 | Duncanson et al. | 270/251 |
| 5,054,034 | 10/1991 | Hughes-Hartogs | 375/222 |
| 5,214,650 | 5/1993 | Renner et al. | 370/276 |
| 5,305,312 | 4/1994 | Fornek et al. | 370/264 |
| 5,375,166 | 12/1994 | Odaohara | 379/93.28 |
| 5,600,654 | 2/1997 | Brown et al. | 370/524 |
| 5,708,663 | 1/1998 | Wright et al. | 370/524 |
| 5,764,693 | 6/1998 | Taylor et al. | 375/222 |

*Primary Examiner*—Chi H. Pham
*Assistant Examiner*—Khai Tran
*Attorney, Agent, or Firm*—Lee E. Chastain

[57] ABSTRACT

An apparatus connects a data processing system (10) with an analog telephone line and/or an ISDN line. The apparatus modulates and demodulates data from the data processing system (10) to either of the two different telephone protocols without adding unnecessary expense or noise to the system.

13 Claims, 2 Drawing Sheets

APPARATUS FOR MODULATING/DEMODULATING SIGNALS

FIELD OF THE INVENTION

The present invention relates to data communications and more specifically to an apparatus for modulating and demodulating signals.

BACKGROUND OF THE INVENTION

Data transmission to home or business computers typically occurs over two types of telephone lines. The first is an analog telephone line and the second is an ISDN telephone line. In order to transmit or receive data from either of these two lines, one is required to use an apparatus that will modulate or demodulate data between a digital data stream and the telephone line, either ISDN or analog. Currently, for analog lines this is done using an analog modem and for ISDN lines it is done using an ISDN modem.

Unfortunately, analog and ISDN lines require separate modems which are not compatible with the data transmission characteristics of both of these transmission lines. More specifically, an ISDN modem cannot be used with regular analog telephone lines. Similarly, an analog modem cannot be used with ISDN telephone lines. This incompatibility between ISDN lines and telephone lines requires an end user to have additional hardware in order to transmit and receive data over these two different transmission lines, requiring additional expense. Furthermore, the use of both systems together is detrimental to the noise characteristics of the incoming and outgoing signals.

DETAILED DESCRIPTION OF A PREFERRED EMBODIMENT

Figure 1:
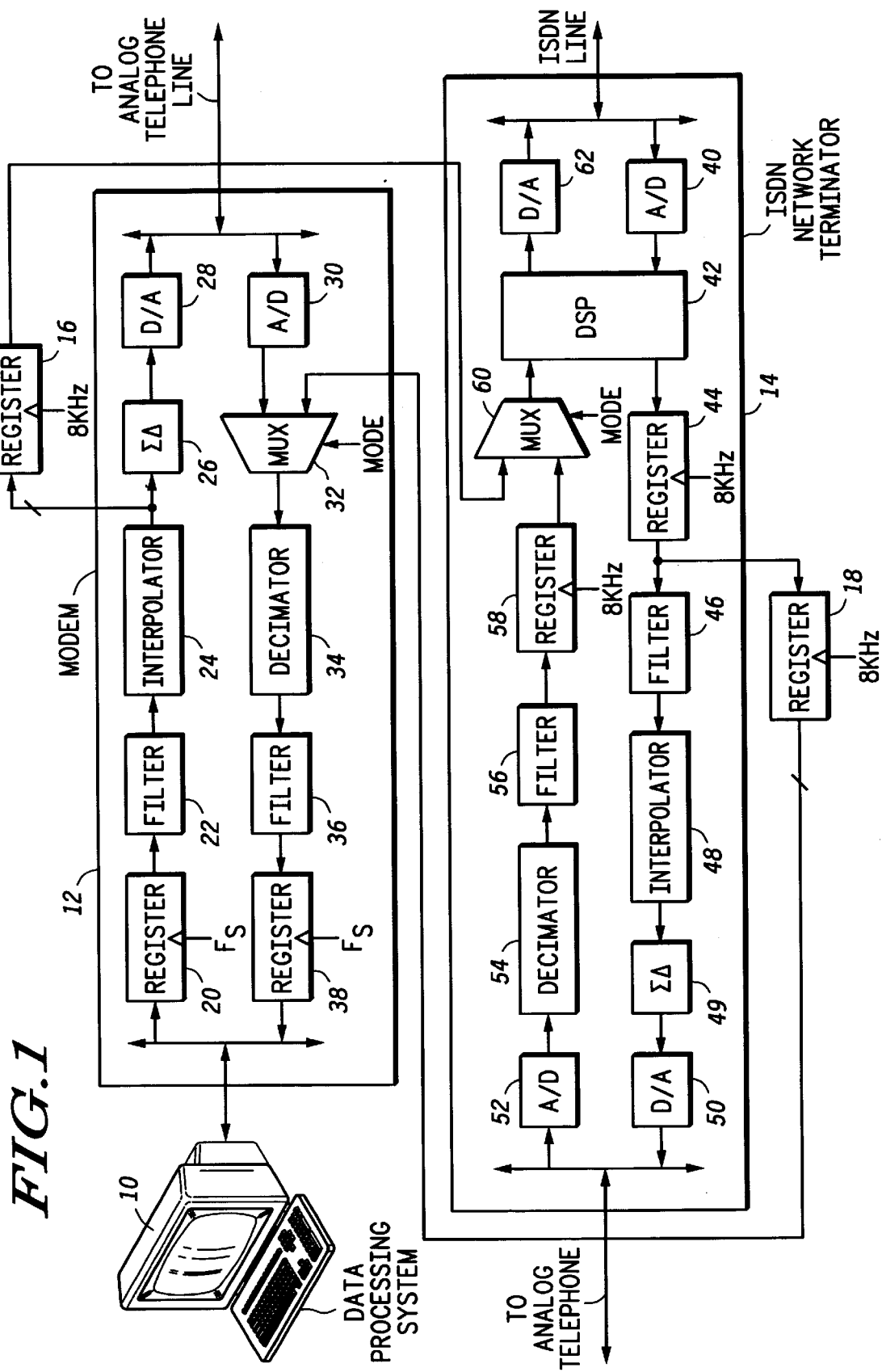
FIG. 1 depicts in block diagram form an apparatus for modulating and demodulating a signal in accordance with one embodiment of the present invention.

Shown in FIG. 1 is an apparatus for modulating and demodulating a signal in accordance with one embodiment of the present invention. The apparatus enables the transmission of computer data over regular telephone lines. Furthermore, the apparatus enables the transmission of computer data over ISDN lines or conventional analog telephone lines with minimal additional hardware.

The apparatus shown in FIG. 1, coupled to a data processing system 10, comprises a modem 12, an ISDN network terminator 14, a register 16, having a sampling frequency of 8 kilohertz, and a register 18 also having a sampling frequency of 8 kilohertz.

Modem 12 comprises a modulator portion and a demodulator portion. A bi-directional datapath couples data processing system 10 to an input of the modulator portion of modem 12. The modulator portion comprises a register 20 whose input is coupled to the bi-directional datapath and whose output is coupled to a filter 22. The output of filter 22 is coupled to the input of an interpolator 24. The output of interpolator 24 is coupled to the input of a sigma delta modulator 26. In addition, the output of interpolator 24 is coupled to the input of register 16. The output of sigma delta modulator 26 is coupled to the input of a digital-to-analog converter 28 (labeled D/A) whose output is coupled to an analog telephone line. The analog telephone line connects the telephone company central office (not shown) to an input of the demodulator portion of modem 12. The demodulation portion comprises an analog-to-digital converter 30 whose input is connected to the analog telephone line. The output of analog-to-digital converter 30 is coupled to one input of a multiplexer 32 (labeled MUX), whose output is selected by a MODE signal. The other input to multiplexer 32 is coupled to the output of register 18. The other input of multiplexer 32 is coupled to the output of register 18. The output of multiplexer 32 is coupled to the input of a decimator 34. The output of decimator 34 is coupled to the input of a filter 36. The output of filter 36 is coupled to the input of register 38. The output of register 38 is coupled to the bi-directional datapath.

ISDN network terminator 14 comprises a transmit portion, a common portion, and a receive portion. A bi-directional analog telephone line connects a telephone handset (not shown) to an input of the transmit portion of ISDN network terminator 14. The transmit portion comprises an analog-to-digital converter 52 whose input is coupled to the bi-directional analog telephone line and whose output is coupled to the input of a decimator 54. The output of decimator 54 is coupled to the input of filter 56. The output of filter 56 is coupled to the input of a register 58.

The output of register 58 is coupled to the common portion of ISDN network terminator 14. The common portion comprises a digital signal processor 42, a multiplexer 60, a register 44, a digital-to-analog converter 62, and a analog-to-digital converter 40. The output of register 58 is coupled to a first input of a multiplexer 60 (labeled MUX) whose output is selected by a MODE signal. The other input to multiplexer 60 is coupled to the output of register 16. A first output of the digital signal processor 42 is coupled to the input of a digital-to-analog converter 62. The output of a digital-to-analog converter 62 is coupled to a bi-directional ISDN datapath. The ISDN datapath connects the telephone company central office (not shown) to the ISDN network terminator 14. The input of the analog-to-digital converter 40 is connected to the bi-directional ISDN datapath. The output of analog-to-digital converter 40 is coupled to a second input of digital signal processor 42. A second output of the digital signal processor 42 is coupled to the input of receive portion of ISDN network terminator 14. It should be appreciated that digital signal processor 42 may be a suitably programmed general purpose digital signal processor(s), data processor, or microcontroller or may be an application specific integrated circuit. The second output of digital signal processor 42 is coupled to the input of register 44. In addition, the output of register 44 is coupled to the input of register 18.

The receive portion of ISDN network terminator 14 comprises a filter 46 whose input is connected to the output of register 44. The output of filter 46 is coupled to the input of a interpolator 48. The output of the interpolator 48 is coupled to the input of a sigma delta modulator 49. The output of the sigma delta modulator 49 is coupled to the input of a analog-to-digital converter 50. The output of the analog-to-digital converter 50 is coupled to the bi-directional analog telephone line.

The present invention may be understood by reference to its three different modes of operation; (1) data transmission from data processing system 10 to analog telephone lines via modem 12, (2) data transmission from data processing system 10 to ISDN lines via modem 12 and ISDN network terminator 14, (3) voice transmission from a telephone to ISDN lines via ISDN network terminator 14.

During data transmission from data processing system 10 to analog telephone lines via modem 12, data is transmitted from data processing system 10 via the modulation potion of modem 12 and data is transmitted to data processing system 10 via the demodulation potion of modem 12.

Continuing with the modulation portion of modem 12, a parallel data stream or a serial data stream is input to register 20 where n bits of the data stream is captured by register 20 which has a sampling frequency $F_S$. The n bits of the captured data stream are filtered so that the data stream conforms to line transmission requirements, typically a low pass filter is used. This filtered data stream is then upsampled by interpolator 24. Interpolator 24 may be a comb integrator circuit. This upsampled data stream is processed by sigma delta modulator 26 to reduce the number of bits required to represent each sample. This reduced data stream is digital-to-analog converted by digital-to-analog converter 28. The analog data is then transmitted over the analog telephone line.

Conversely with the demodulation portion of modem 12, an analog signal is input to analog-to-digital converter 30 which produces a digital data stream. This digital data stream is then input to multiplexer 32 whose MODE signal selected such that the output of the analog-to-digital converter is the output of the multiplexer 32. This data stream is then downsampled by decimator 34. Decimator 34 may be a comb integrator circuit. The downsampled data stream is then filtered by filter 36, typically a low pass filter. N bits of the filtered data stream are then captured by register 38 which has a sampling frequency of $F_S$. The captured data stream is then output to data processing system 10.

During data transmission from data processing system 10 to the ISDN line, data is transmitted from data processing system 10 via the modulation portion of modem 12 and a portion of ISDN network terminator 14. Conversely data is received by data processing system 10 from ISDN line via the demodulation portion of modem 12 and a portion of ISDN network terminator 14.

Continuing with the transmission of data from data processing system 10, a parallel data stream or a serial data stream is input to register 20 where n bits of the data stream is captured by register 20 which has a sampling frequency $F_S$. The n bits of the captured data stream are filtered so that the data stream conforms to line transmission requirements. This filtered data stream is then upsampled by interpolator 24. The upsampled data stream is input to register 16 where n bits of the upsampled data stream is captured by register 16 which has a sampling frequency of 8 Khz. It should be appreciate that 8 Khz is currently the sampling frequency of signal in and out of ISDN lines. The output of register 16 is then input into the common portion of the ISDN network terminator 14. Specifically, the n bits captured by register 16 are input to multiplexer 60. The MODE signal is selected to couple the output of register 16 to the first input of DSP 42. DSP 42 is used, among other things, to provide echo cancellation of transmitted signal on the receive stream of the ISDN line. Other functions of the DSP 42 include timing, framing, and activation/deactivation of the communication link. The output of DSP 42 is then coupled to the input of digital-to-analog converter 62 which converts the data stream from a digital form into an analog form.

Conversely with the reception of data by data processing system 10 from the ISDN line, an analog signal from the ISDN line is input to analog-to-digital converter 40 which produces a digital data stream. This digital data stream is then input DSP 42. DSP 42 provides echo cancellation and line equalization. The output of DSP 42 is input to register 18 where n bits of the data stream is captured at a sampling frequency of 8 Khz. The output of register 18 is then input to the demodulation portion of modem 12. Specifically, the n bits of data captured by register 18 are input to multiplexer 32. The MODE signal of multiplexer 32 is selected such that the output of the register 18 is the output of the multiplexer 32. This data stream is then downsampled by decimator 34. The downsampled data stream is then filtered by filter 36. N bits of the filtered data stream are then captured by register 38 which has a sampling frequency of $F_S$. The captured data stream is output to data processing system 10.

It should be appreciated that ISDN network terminator 14 may also be used to transmit sampled analog signals to and receive sampled analog signals from the ISDN line. Specifically, an analog signal transmitted from a telephone (not shown) is input to an analog-to-digital converter 52 where it generates a reduced bit data stream. The reduced bit stream is then downsampled by decimator 54. The output of decimator 54 is filtered by filter 56, typically a low pass filter, to produce an n bit data stream. The reduced bit data stream is filtered so that resulting n bit data stream conforms to line transmission requirements. This data stream is then input the common portion of ISDN network terminator 14. Specifically, the output of register 58 is input to multiplexer 60 whose MODE signal is selected such that the output of register 58 is now the output of the multiplexer 60. The operation of the common portion of ISDN network terminator 14 is described above in connection with the discussion of the transmission of data from data processing system 10 to the ISDN line.

Conversely, the reception of an analog signal from the ISDN line destined for the telephone line is processed by the common portion of ISDN network terminator 14 as described above in connection with the discussion of the reception of data at data processing system 10 from the ISDN line. The output of register 44 is input to filter 46. Filter 46 reduces noise and also conforms the signal to analog telephone requirements. This filtered data stream is then upsampled by interpolator 48. Interpolator 48 may be a comb integrator circuit. This upsampled data stream is processed by sigma delta modulator 49 to reduce the number of bits required to represent each sample. This reduced data stream is then input to digital-to-analog converter 50 where the signal is converted to an analog signal. The analog data is then transmitted to the analog telephone.

Figure 2:
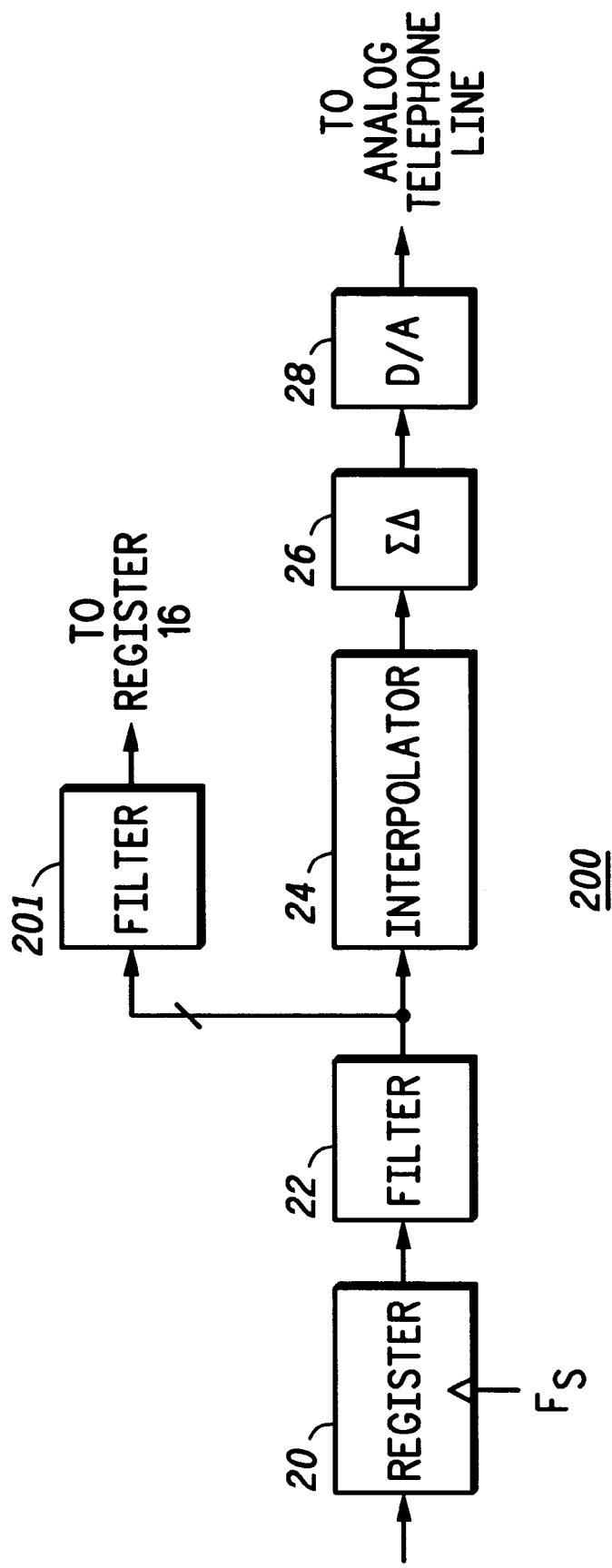
FIG. 2 depicts in block diagram form a portion of an apparatus for modulating and demodulating a signal in accordance with an alternative embodiment of the present invention; and Wherein like reference numerals designate identical or corresponding parts throughout the several views

FIG. 2 depicts in block diagram form a portion 200 of an apparatus for modulating and demodulating a signal in accordance with an alternative embodiment of the present invention. In this embodiment, data transmitted to ISDN network terminator 14 is coupled to the output of filter 22 instead of to the output of interpolator 24. In this alternate embodiment the output of filter 22 is filtered by a filter 201 before being latched by register 16. Filter 201 performs the necessary filtering to prevent aliasing. In FIG. 1 this function is performed by interpolator 24. It should be appreciated that interpolator 24 and sigma delta modulator 26 may be omitted, in which case digital-to-analog converter 28 would have to be a multibit digital-to-analog converter.

Although the invention has been described and illustrated with reference to specific embodiments thereof, it is not intended that the invention be limited to these illustrative embodiments. Those skilled in the art will recognize that modifications and variations can be made without departing from the spirit of the invention. For example, the data manipulated by data processing system 10 may be considered a first domain. Furthermore, the ISDN line coupled to ISDN network terminator 14, the analog telephone line coupled to modem 12, and the analog telephone line coupled to ISDN network terminator 14 may be considered to be a second, a third, and a fourth domain, respectively. Therefore, it is intended that this invention encompass all such variations and modifications as fall within the scope of the appended claims.

We claim:

1. An apparatus for modulating/demodulating signals of a data stream between a first domain and either a second domain or a third domain, the apparatus comprising:

a modulator further comprising;
   a first register, an input thereof receiving signals of a data stream;
   a second register, an input thereof coupled to an output of the first register, an output thereof outputting the data stream in a second domain;
   a digital-to-analog converter, an input thereof coupled to the output of the first register, an output thereof outputting the data stream in a third domain; and
a demodulator further comprising;
   an analog-to-digital converter, an input thereof receiving signals from the third domain;
   a multiplexer, a first input thereof coupled to an output of the analog-to-digital converter and a second input thereof coupled to the signals from the second domain;
   a third register coupled to an output of the multiplexer, an output of the third register outputting the signals of the data stream to the first domain.

2. The apparatus of claim 1 wherein the second domain is an integrated services digital network (ISDN) domain and the third domain is an analog telephone line domain.

3. The apparatus of claim 1 wherein the modulator further comprises:

an interpolator, an input thereof coupled to an output of the first register operable to sample the signals from the first domain at a rate greater than the first domain;
sigma delta modulator, an input thereof coupled to an output of the interpolator, an output thereof coupled to the digital-to-analog converter;
wherein an input of the second register is coupled to the output of the interpolator; and
and wherein the demodulator further comprises:
   a decimator, an input thereof coupled to the output of the multiplexer operable to sample the signals at a rate equal to the first domain.

4. The apparatus of claim 3 wherein the modulator further comprises:

a first filter (22), an input thereof coupled to an output of the first register, the first filter operable to condition the signals to the third domain; and
a second filter (201), an input thereof coupled to an output of the first filter, an output thereof coupled to an input of the second register, the second filter operable to prevent frequency aliasing of the data stream in the second domain.

5. The apparatus of claim 4 wherein the modulator further comprises a first filter (22), an input thereof coupled to an output of the first register, the first filter operable to condition the signals to the third domain.

6. The apparatus of claim 5 wherein the second domain is an integrated services digital network (ISDN) domain and the third domain is an analog telephone line domain.

7. The apparatus of claim 1 wherein the modulator further comprises:

a first filter (22), an input thereof coupled to an output of the first register, the first filter operable to condition the signals to the third domain; and
a second filter (201), an input thereof coupled to an output of the first filter, an output thereof coupled to an input of the second register, the second filter operable to prevent frequency aliasing of the data stream in the second domain.

8. The apparatus of claim 7 wherein the second domain is an integrated services digital network (ISDN) domain and the third domain is an analog telephone line domain.

9. An apparatus for modulating/demodulating signals of a data stream between a first domain and either a second domain or a third domain, the apparatus comprising:

a modem further comprising:
   a modulator itself further comprising;
     a first register, an input thereof receiving signals of a data stream;
     a second register, an input thereof coupled to an output of the first register;
     a first digital-to-analog converter, an input thereof coupled to the first register, an output thereof outputting the data stream in a second domain;
   a demodulator itself further comprising;
     a first analog-to-digital converter, an input thereof receiving signals from the second domain;
     a multiplexer, a first input thereof coupled to an output of the first analog-to-digital converter;
     a third register, an input thereof coupled to an output of the multiplexer, an output of the third register outputting the data stream to the first domain; and
   a network terminator further comprising:
     a second analog-to-digital converter, an input thereof receiving signals from a third domain;
     a digital signal processing means, a first input thereof coupled to an output of the second analog-to-digital converter, a second input thereof coupled to an output of the second register, a first output thereof coupled to a second input of the multiplexer, the digital signal processing means filtering the data stream;
     a second digital-to-analog converter, an input thereof coupled to a first output of the digital signal processing means, an output thereof outputting the data stream in the third domain.

10. The apparatus of claim 9 wherein the network terminator further comprises:

a transmit path itself further comprising;
   a third analog-to-digital converter, an input thereof receiving the data stream from a fourth domain;
   a first filter, an input thereof coupled to an output of the third analog-to-digital converter, the first filter operable to condition the signals to the second domain;
   a fourth register, an input thereof coupled to an output of the first filter;
   a second multiplexer, a first input thereof coupled to the output of the second register, a second input thereof coupled to an output of the fourth register, an output thereof coupled to the second input of the digital signal processing means; and a receive path itself further comprising;
- a fifth register, an input thereof coupled to an second output of the digital signal processing means;
- a sixth register, an input thereof coupled to an output of the fifth register, an output thereof coupled to the second input of the multiplexer;
- a second filter, an input thereof coupled to the output of the fifth register, the second filter operable to condition the signals to the fourth domain;
- a third digital-to-analog converter, an input thereof coupled to an output of the second filter, an output thereof outputting signals to the fourth domain.

11. The apparatus of claim 10 wherein the receive path further comprises:
- an interpolator, an input thereof coupled to an output of the second filter operable to sample the signals from the second domain at a rate greater than the second domain; and and wherein the transmit path further comprises:
- a decimator, an input thereof coupled to the output of the third analog-to-digital converter operable to sample the signals at a rate equal to the fourth domain.

12. The apparatus of claim 11 wherein the second domain is an analog telephone line domain and the third domain is an integrated services digital network (ISDN) domain.

13. The apparatus of claim 9 wherein the second domain is an analog telephone line domain and the third domain is an integrated services digital network (ISDN) domain.

* * * * *